US012781096B2

(12) United States Patent
Kuszaj et al.

(10) Patent No.: US 12,781,096 B2
(45) Date of Patent: Nov. 3, 2026

(54) TRILAYER POLYMER ADHESIVE FILM, METHOD OF BONDING PATTERNED SUBSTRATES, MULTILAYER CONDUCTOR, AND METHOD OF FORMING A MULTILAYER CONDUCTOR

(71) Applicant: ROGERS CORPORATION, Chandler, AZ (US)

(72) Inventors: Michael S. Kuszaj, Brooklyn, CT (US); Rebecca Agapov, Bear, DE (US); Vitali Judin, Leopoldshafen (DE); Karl Sprentall, Woburn, MA (US)

(73) Assignee: ROGERS CORPORATION, Chandler, AZ (US)

( * ) Notice: Subject to any disclaimer, the term of this patent is extended or adjusted under 35 U.S.C. 154(b) by 326 days.

(21) Appl. No.: 18/607,897

(22) Filed: Mar. 18, 2024

(65) Prior Publication Data

US 2024/0336812 A1 Oct. 10, 2024

Related U.S. Application Data

(60) Provisional application No. 63/458,207, filed on Apr. 10, 2023.

(51) Int. Cl.
*C09J 7/24* (2018.01)
*C09J 127/12* (2006.01)
(Continued)

(52) U.S. Cl.
CPC ............. *C09J 7/243* (2018.01); *C09J 127/12* (2013.01); *C09J 171/02* (2013.01); *H01B 1/122* (2013.01);
(Continued)

(58) Field of Classification Search
CPC ........................................................ C09J 7/243
(Continued)

(56) References Cited

U.S. PATENT DOCUMENTS

| | | | | |
|---|---|---|---|---|
| 5,141,800 | A | 8/1992 | Effenberger et al. | |
| 2004/0214023 | A1* | 10/2004 | Park | H01J 11/10 428/209 |

(Continued)

FOREIGN PATENT DOCUMENTS

| | | | |
|---|---|---|---|
| CN | 110062520 | A | 7/2019 |
| JP | 3224207 | B2 | 10/2001 |

(Continued)

OTHER PUBLICATIONS

International Search Report and Written Opinion for the corresponding International Application No. PCT/US2024/016887; International Filing Date: Feb. 22, 2024; Date of Mailing: Jun. 14, 2024; 50 pages.

*Primary Examiner* — Stanley Tso
(74) *Attorney, Agent, or Firm* — CANTOR COLBURN LLP

(57) ABSTRACT

A trilayer polymer film includes a core layer and first and second outer layers on opposing surfaces of the core layer. The compositions of each of the layers is as described herein, wherein the first outer layer and the second outer layer each independently include a fluoropolymer having a melting temperature that is at least 15° C. less than a melting temperature of the core layer. The film can be useful in the preparation of multilayer conductors and magnetic self-resonant structures.

7 Claims, 3 Drawing Sheets

(51) Int. Cl.
*C09J 171/02* (2006.01)
*H01B 1/12* (2006.01)

(52) U.S. Cl.
CPC ...... *C09J 2301/16* (2020.08); *C09J 2301/312* (2020.08); *C09J 2301/50* (2020.08)

(58) Field of Classification Search
USPC .......................................................... 174/250
See application file for complete search history.

(56) References Cited

U.S. PATENT DOCUMENTS

| | | | | |
|---|---|---|---|---|
| 2020/0404782 | A1* | 12/2020 | Chen | H05K 1/0366 |
| 2021/0307161 | A1* | 9/2021 | Neill | B32B 15/16 |
| 2022/0117085 | A1 | 4/2022 | Higashira et al. | |

FOREIGN PATENT DOCUMENTS

| | | | |
|---|---|---|---|
| JP | 2022101117 | A | 7/2022 |
| WO | 2021194810 | A1 | 9/2021 |

* cited by examiner

TRILAYER POLYMER ADHESIVE FILM, METHOD OF BONDING PATTERNED SUBSTRATES, MULTILAYER CONDUCTOR, AND METHOD OF FORMING A MULTILAYER CONDUCTOR

CROSS-REFERENCE TO RELATED APPLICATION

This application claims priority to U.S. Provisional Patent Application No. 63/458,207, filed on Apr. 10, 2023, the content of which is hereby incorporated by reference in its entirety.

FIELD OF THE INVENTION

This disclosure relates generally to trilayer polymer adhesive films and methods of using the same, particularly in a method of bonding patterned substrates.

BACKGROUND

Inductive wireless power transfer provides a method for powering and recharging mobile electronic devices, such as smartphones. It is desirable for this technology to be highly efficient and easy to manufacture, for example with an inexpensive, high volume method. Such technology can enable powering and recharging of high power items including electric passenger vehicles, forklifts, material handling equipment, busses, or automated guided vehicles.

Existing methods to enable inductive wireless power transfer can use a magnetic self-resonant structure. These structures may include a plurality of conductors which are patterned and bonded together, maintaining the same z-axis distance between each set of conductors. Due to the thickness of the conductors and the required z-axis spacing between them, bonding the conductors together provides a challenge.

It would therefore be desirable to provide a method of bonding conductors that can overcome the above-described technical limitations. It would be particularly advantageous to provide a bonded multilayer conductor having a predetermined and consistent z-axis spacing between adjacent conductors. Such structures may be particularly well suited for use as magnetic self-resonant structures for inductive wireless power transfer applications.

SUMMARY

A trilayer polymer adhesive film comprises a core layer comprising polytetrafluoroethylene, a perfluoroalkoxy polymer, or a fluorinated ethylene propylene polymer; a first outer layer on a first surface of the core layer; and a second outer layer on a second surface of the core layer, opposite the first outer layer; wherein the first outer layer and the second outer layer each independently comprises a fluoropolymer having a melting temperature that is at least 15° C. less than a melting temperature of the core layer.

A method of bonding patterned substrates comprises contacting a first patterned substrate with the film, wherein a patterned surface of the first patterned substrate contacts the first outer layer of the film; contacting a second patterned substrate with the film on a side opposite the first patterned substrate, wherein a patterned surface of the second patterned substrate contacts the second outer layer of the film; and laminating the first patterned substrate, the film, and the second patterned substrate to provide a bonded stack comprising: the first patterned substrate; the second patterned substrate; a polymer core layer comprising polytetrafluoroethylene, a perfluoroalkoxy polymer, or a fluorinated ethylene propylene polymer between the first patterned substrate and the second patterned substrate and in contact with the patterned surface of each of the first patterned substrate and the second patterned substrate; wherein voids of the patterned features of each of the first patterned substrate and the second patterned substrate are filled with a second polymer component derived from the first and second outer layers of the film.

A multilayer conductor comprises a first patterned conductor having a patterned surface; a second patterned conductor having a patterned surface; a polymer adhesive layer comprising polytetrafluoroethylene, a perfluoroalkoxy polymer, or a fluorinated ethylene propylene polymer between the first patterned conductor and the second patterned conductor and in contact with the patterned surface of each of the first patterned conductor and the second patterned conductor; wherein a second polymer component fills voids of the patterned features of each of the first patterned conductor and the second patterned conductor; wherein the second polymer component is in contact with the first patterned conductor and a first side of the polymer core layer and between the second patterned conductor and a second side of the polymer core layer; and wherein the second polymer component comprises a fluoropolymer having a melting temperature that is at least 15° C. less than a melting temperature of the polymer core layer.

A method of forming a multilayer conductor comprises providing a first layer having a first conductor bonded to a first side of a first dielectric layer, and a second conductor bonded to a second side of the first dielectric layer, wherein the first side of the dielectric layer is opposed the second side of the dielectric layer, and wherein each of the first and the second conductors has a plurality of patterned conductor features defining a plurality of voids on the first and second conductors, on a side opposite the dielectric layer; providing a second layer having a third conductor bonded to a first side of a second dielectric layer, and a fourth conductor bonded to a second side of the second dielectric layer, wherein the first side of the second dielectric layer is opposed the second side of the second dielectric layer, and wherein each of the third and the fourth conductors has a plurality of patterned conductor features defining a plurality of voids on the third and fourth conductors, on a side opposite the second dielectric layer; contacting the first layer with a first side of a first trilayer polymer film and contacting the second layer with a second side of the first film, wherein the first side opposes the second side of the first film, and wherein the patterned conductor features of the first conductor contact the first outer layer of the first film and the patterned conductor features of the third conductor contact the second outer layer of the first film; and laminating the first layer, the first film, and the second layer, wherein voids of the patterned features of each of the first conductor and the third conductor are filled with a polymer component derived from the first and second outer layers of the first film.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Previous bonding materials are typically a single layer material which can optionally include a reinforcing material. Such materials can bond conductors by flowing into and filling the structured conductors. The thickness of the final layer between the structured conductor layers is difficult or impossible to control. In addition, due to high flow of previous bonding materials, excess bonding material can squeeze out of the multilayer structure, rather than providing a certain thickness between the conductor layers.

The present inventors have unexpectedly discovered that use of a particular trilayer polymeric film can address the above-described technical challenges for producing bonded multilayer conductors. In an advantageous feature, the particular trilayer polymeric film described herein can enable bonding of patterned conductors where the spacing between each conductor layer can be controlled.

Figure 1:
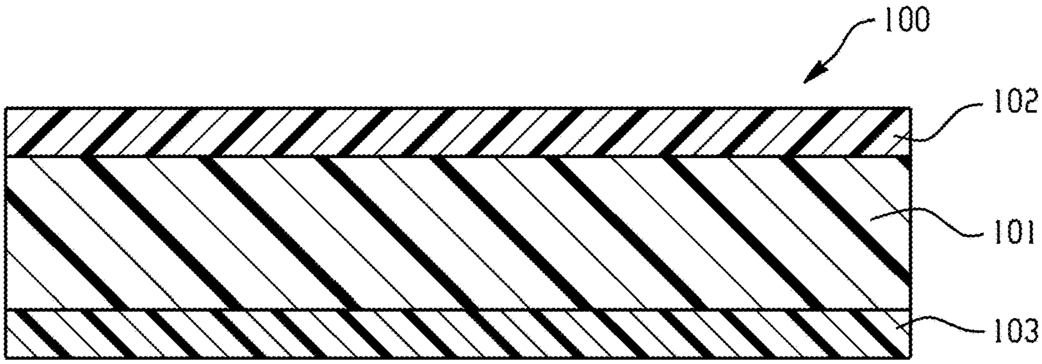
FIG. 1 is an illustration of a cross-section of a trilayer polymer film according to an aspect of the present disclosure.

Accordingly, an aspect of the present disclosure is a trilayer polymer film, also referred to herein as a trilayer polymer adhesive film, a polymer film, and a film for brevity. An exemplary trilayer polymer film is illustrated in FIG. 1. As shown in FIG. 1, the trilayer polymer film (100) comprises a core layer (101), a first outer layer (102) on a first surface of the core layer, and a second outer layer (103) on a second surface of the core layer, opposite the first outer layer.

The present inventors have found that careful selection of the materials for use in each of the layers can enable efficient bonding of patterned conductors. The trilayer polymer film can be a freestanding trilayer polymer film. As used herein, the term "freestanding trilayer polymer film" refers to a film that is not adhered or supported by any other layers, for example an underlying substrate. In an aspect, the freestanding trilayer polymer film is a film that is self-supporting, which can be mechanically manipulated or moved without the need of a substrate (or other supporting layer) adhered or affixed to the film. Thus, in an aspect, the freestanding trilayer polymer film of the present disclosure refers to an individual film free of any other supporting layers. In some aspects, the freestanding trilayer polymer film can consist of the core layer, the first outer layer, and the second outer layer. The first outer layer and the second outer layer can each be directly on the respective surfaces of the core layer. Stated another way, in an aspect, no intervening layers are present between the first outer layer and the core layer or between the second outer layer and the core layer.

The core layer comprises polytetrafluoroethylene, a perfluoroalkoxy polymer, or a fluorinated ethylene propylene polymer.

In an aspect, the core layer comprises polytetrafluoroethylene (PTFE). PTFE is a fluorinated polymer having a CAS Reg. No. of 9002-84-0. PTFE comprises repeating units of the formula $—(CF_2CF_2)_n—$. PTFE can be prepared by any suitable method, for example polymerization via a dispersion or emulsion polymerization process, and which has not been agglomerated, irradiated, or thermally degraded. In an aspect, the PTFE can comprise a low molecular weight PTFE. PTFE is commercially available, for example, from Saint-Gobain.

In an aspect, the core layer can comprise a perfluoroalkoxy (PFA) polymer. PFA is a fluorinated copolymer comprising repeating units of the structure $—((C_2F_4)_n—(C_2F_3OR)_m—$, wherein R is a perfluorinated $C_{1-6}$ alkyl group such as $CF_3$. Exemplary PFA polymers are available from Saint-Gobain.

In an aspect the core layer comprises a fluorinated ethylene propylene (FEP) polymer. FEP is a fluorinated copolymer comprising repeating units of the structure $—(CF_2CF_2)_n—(CF_2CF(CF_3))_m—$. Exemplary FEP polymers are available from Saint-Gobain.

The core layer can comprise, consist essentially of, or consist of the polytetrafluoroethylene, a perfluoroalkoxy polymer, or a fluorinated ethylene propylene polymer. In an aspect, no other polymer components are present in the core layer.

The core layer can optionally further comprise a reinforcing agent. The reinforcing filler can generally comprise any reinforcing filler. In an aspect, the reinforcing filler can have a high aspect ratio (e.g., an aspect ratio of greater than 1:1, or greater than 5:1, or greater than 10:1, or greater than 20:1, or greater than 40:1). For example, the reinforcing filler can comprise nanofibers or nanoplates. Preferred reinforcing agents are not electrically conductive. Non-conductive particles are defined as those with greater than $1\times10^8$ ohm resistivity. In an aspect, an electrically conductive filler can be excluded from the core layer.

Exemplary reinforcing fillers can include, for example, mica, quartz, glass, calcium silicate, aluminum silicate, zirconium silicate, aluminum silicates, titanium dioxide, barium titanate, calcium carbonate, calcium sulfate, ferric oxide, lithium aluminum silicate, silicon carbide, magnesium silicate, zirconium oxide, or a combination thereof. The reinforcing fillers can optionally be surface treated to improve adhesion and dispersion with the core layer.

In an aspect, the reinforcing filler can preferably be a fibrous reinforcing filler, for example, glass fibers. Glass fibers can include E, A, C, ECR, R, S, D, or NE glasses, or the like. The reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like. In an aspect, when present, the reinforcing filler can comprise glass fibers.

When present, reinforcing fillers can be included in the core layer in amounts of, for example, greater than 0 to 20 weight percent, of 4 to 20 weight percent, based on the total weight of the core layer.

In an aspect, the core layer can have a thickness of 1 to 25 micrometers, or 1 to 15 micrometers, or 1 to 10 micrometers, or 2 to 10 micrometers. In aspects in which the trilayer polymer film is used to bond patterned conductors, the core layer can have a thickness that is within 10% of the thickness of a dielectric layer so as to maintain a desired spacing between the bonded conductors. Accordingly the thickness of the core layer can be selected based on the thickness of a dielectric layer in a conductor stack, using the guidance provided herein.

The first outer layer and the second outer layer each independently comprises a fluoropolymer, provided that the fluoropolymer of each of the first and second outer layers has a melting temperature that is at least 15° C. less than the melting temperature of the core layer. The first outer layer and the second outer layer can each comprise the same fluoropolymer or can each comprise a different fluoropolymer. In an aspect, the fluoropolymer of each of the first and second outer layers has a melting temperature that is 15 to 150° C. less than the melting temperature of the core layer, or 15 to 100° C. less than the melting temperature of the core layer, or 15 to 80° C. less than the melting temperature of the core layer, or 20 to 80° C. less than the melting temperature of the core layer. Some fluoropolymer materials that may be useful for the outer layers can exhibit a melting temperature range. As used herein, the term "melting temperature range" refers to the temperature range from a melt onset temperature to the temperature at which the material is completely melted. As used herein, the term "melt onset temperature" refers to the temperature at which the meltable material begins to exhibit an increase in unit heat absorption per degree Celsius, as determined by differential scanning calorimetry. Below its melt onset temperature, the transport material can be solid. For example, copolymer structures can melt over a range depending on the composition. In an aspect, the term "melting temperature" can refer to the melt onset temperature.

In addition to selecting a material having a suitable melting temperature relative to the core layer as discussed above, the first outer layer and the second outer layer compositions can further be selected based on the dissipation factor of the material. In an aspect, the fluoropolymer of the first and second outer layers can exhibit a dissipation factor of less than 0.0006, at a frequency of $10^3$ Hz.

"Fluoropolymer" as used herein includes homopolymers and copolymers that comprise repeat units derived from a fluorinated alpha-olefin monomer, i.e., an alpha-olefin monomer that includes at least one fluorine atom substituent, and optionally, a non-fluorinated, ethylenically unsaturated monomer reactive with the fluorinated alpha-olefin monomer. Exemplary fluoropolymers can include poly(chlorotrifluoroethylene) (PCTFE), poly(chlorotrifluoroethylene-propylene), poly(ethylene-tetrafluoroethylene) (ETFE), poly (ethylene-chlorotrifluoroethylene) (ECTFE), poly (hexafluoropropylenc), poly(tetrafluoroethylene) (PTFE), poly(tetrafluoroethylene-ethylene-propylene), poly(tetrafluoroethylene-hexafluoropropylene) (also known as fluorinated ethylene-propylene copolymer (FEP)), poly(tetrafluoroethylene-propylene) (also known as fluoroelastomer) (FEPM), poly(tetrafluoroethylene-perfluoropropylene vinyl ether), a copolymer having a tetrafluoroethylene backbone with a fully fluorinated alkoxy side chain (also known as a perfluoroalkoxy polymer (PFA)) (for example, poly(tetrafluoroethylene-perfluoropropylene vinyl ether)), polyvinylfluoride (PVF), polyvinylidene fluoride (PVDF), poly(vinylidene fluoride-chlorotrifluoroethylene), perfluoropolyether, perfluorosulfonic acid, or perfluoropolyoxetanc.

In an aspect, the first outer layer and the second outer layer can each independently comprise a perfluoroalkoxy alkane polymer or fluorinated ethylene-propylene. In a specific aspect, the first outer layer and the second outer layer can each independently comprise a perfluoroalkoxy alkane polymer.

In a specific aspect, the first outer layer and the second outer layer each independently comprises a fluoropolymer comprising a perfluoroalkoxy polymer or a fluorinated ethylene propylene polymer.

The first outer layer and the second outer layer can each independently comprise, consist essentially of, or consist of the fluoropolymer, for example a perfluoroalkoxy polymer or a fluorinated ethylene propylene polymer. In an aspect, no other polymer components are present in either of the first outer layer and the second outer layer.

In an aspect, the first outer layer and the second outer layer can each independently have a thickness of 0.5 to 500 micrometers, for example 1 to 250 micrometers, or 1 to 150 micrometers, or 1 to 100 micrometers, or 0.5 to 100 micrometers, or 0.5 to 75 micrometers, or 0.5 to 50 micrometers, or 0.5 to 20 micrometers, or 1 to 20 micrometers. In an aspect, it can be desirable to have thin first and second outer layers, for example 100 micrometers or less, or 50 micrometers or less, or 20 micrometers or less, or 10 micrometers of less. When the thickness is significantly greater, the outer layers can undesirably leak when using the trilayer film as an adhesive, leading to polymer material present in locations that are not intended.

In aspects in which the trilayer polymer film is used to bond patterned conductors, it will be understood that the first and second outer layers will each have a thickness effective to provide a sufficient amount of material comprising the fluoropolymer of the first and second outer layers to fill the open volume of the patterned conductor. Thus a suitable thickness of each of the first and second outer layers can be selected by the skilled person based on the open volume of a patterned conductor to be bonded using the trilayer film, guided by the present disclosure.

In a specific aspect, the trilayer polymer film comprises the core layer comprising polytetrafluoroethylene, and the first outer layer and the second outer layer each comprising a perfluoroalkoxy polymer.

In a specific aspect, the trilayer polymer film comprises the core layer comprising polytetrafluoroethylene, and the first outer layer and the second outer layer each comprising a fluorinated ethylene propylene polymer.

In another specific aspect, the trilayer polymer film comprises the core layer comprising a perfluoroalkoxy polymer, and the first outer layer and the second outer layer each comprising a fluorinated ethylene propylene polymer.

The trilayer polymer films can be manufactured using standard methods for preparing multilayer polymer films. For example, layers or films comprising each of the desired materials for the respective layers can be assembled in the desired order and laminating under pressure. The pressure is sufficient to tack bond the layers of the film together, allowing them to be moved as a single layer. Pressure can be applied, for example, using a weighted roller, for example a 1 pound (lb) (0.454 kilogram (kg)) roller.

The trilayer polymer film of the present disclosure is particularly well suited for bonding patterned substrates. A method of bonding patterned substrates using the trilayer polymer film therefore represents another aspect of the present disclosure.

The method comprises contacting a first patterned substrate with the trilayer polymer film. The patterned surface of the first patterned substrate contacts the first outer layer of the trilayer polymer film. The method further comprises contacting a second patterned substrate with the trilayer polymer film on a side opposite the first patterned substrate. The patterned surface of the second patterned substrate contacts the second outer layer of the trilayer polymer film.

Figure 2:
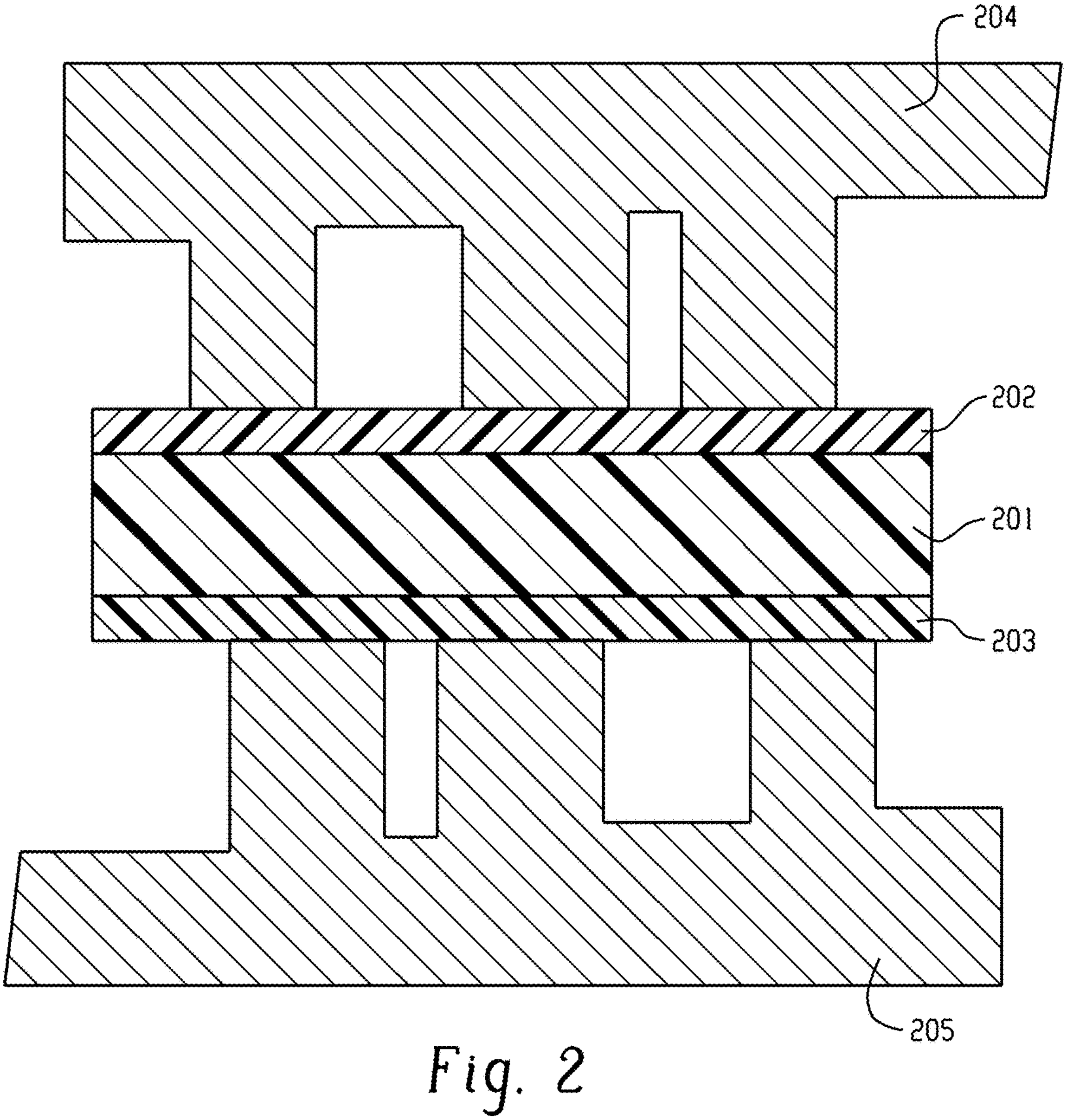
FIG. 2 is an illustration of a cross section of a first patterned substrate, a trilayer polymer film, and a second patterned substrate prior to lamination.

FIG. 2 depicts the arrangement of the first patterned substrate (204) on the first outer layer (202) which is on the core layer (201) of the trilayer polymer film, and the second patterned substrate (205) on the second outer layer (203) of the trilayer polymer film after the contacting. It is noted that FIG. 2 is not drawn to scale.

The method further comprises laminating the first patterned substrate, the trilayer polymer film, and the second patterned substrate to provide a bonded stack. The bonded stack comprises the first patterned substrate, the second patterned substrate, and a polymer core layer comprising polytetrafluoroethylene, a perfluoroalkoxy polymer, or a fluorinated ethylene propylene polymer between the first patterned substrate and the second patterned substrate and in contact with the patterned surface of each of the first patterned substrate and the second patterned substrate. The polymer core layer of the bonded stack is equivalent to the core layer of the initial trilayer polymer film. The laminating conditions are selected such that the first and second outer layers of the trilayer polymer film melt, but the core layer remains intact and substantially unchanged. Accordingly, melted first and second outer layers flow and fill the voids of the patterned structures on each of the first and second patterned substrates. Accordingly, the voids of the patterned features of each of the first patterned substrate and the second patterned substrate are filled with a polymer component derived from the first and second outer layers of the trilayer polymer film upon formation of the bonded stack.

Figure 3:
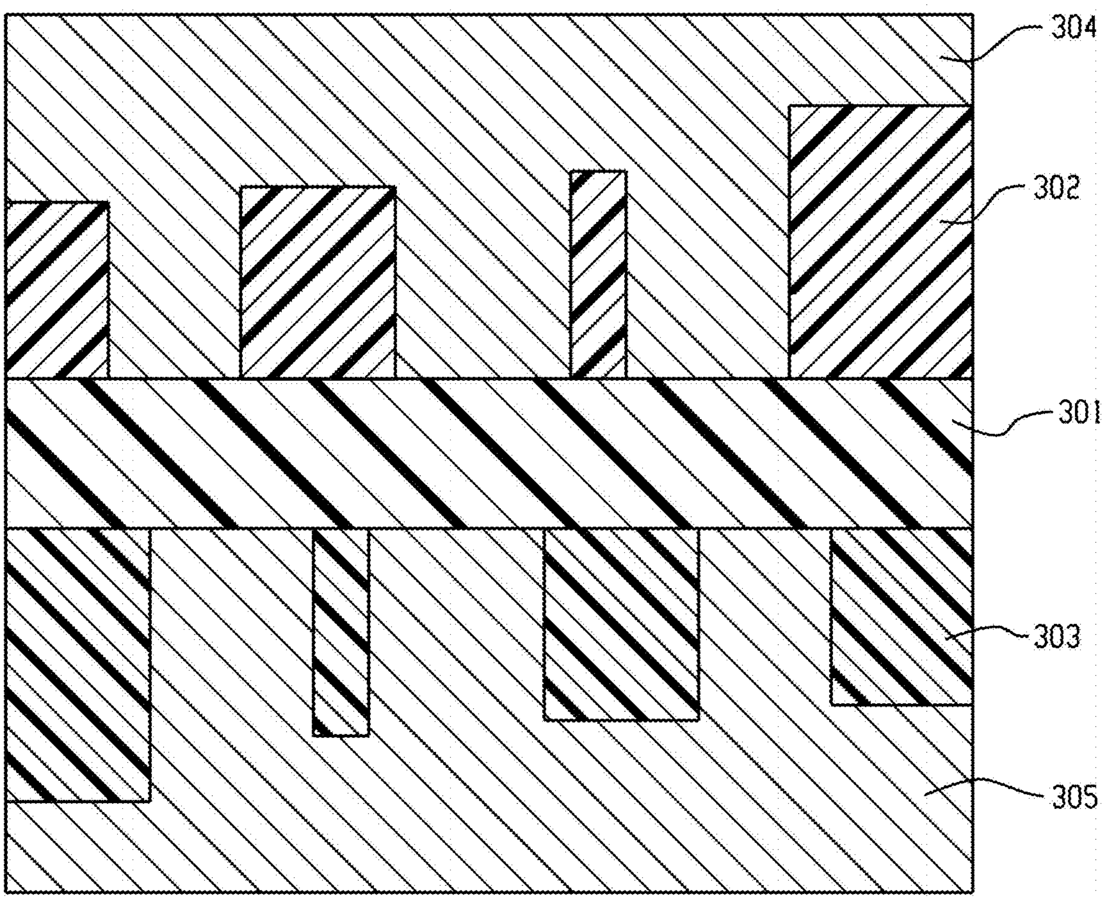
FIG. 3 is an illustration of a cross section of a bonded stack according to an aspect of the present disclosure.

FIG. 3 depicts an illustration of a cross sectional view of a bonded stack. As shown in FIG. 3, the bonded stack comprises the first patterned substrate (304), the second patterned substrate (305), and the polymer core layer (301). The voids of the patterned features of the first and second patterned substrates are filled with a polymer component (302, 303) derived from the first and second outer layers, respectively.

In some aspects, the polymer component (derived from the first and second outer layers) can also be present as a thin layer at an interface between the polymer core layer and the first patterned substrate, the second patterned substrate, or both.

The first and second patterned substrates can each independently have a thickness of, for example, 35 to 105 micrometers. The first patterned substrate and the second patterned substrate can be patterned conductors, for example comprising copper or aluminum.

In an advantageous feature, the bonded stack does not have air gaps between the patterned substrates and the polymer core layer.

In some aspects, a dielectric layer can be present on one or both of the patterned conductors, on a side opposite the polymer core layer (or on a side opposite the trilayer polymer film prior to laminating). The dielectric layer can comprise a thermosetting composition, a thermoplastic composition, ceramics, or a combination thereof. Exemplary materials can include glass-reinforced epoxy laminate materials known as FR4, or materials such as PTFE-based laminates available from Rogers Corporation as the RO3000™ Series, ceramic-filled or woven glass reinforced PTFE laminates available from AGC Inc., or circuit board materials from Panasonic Corporation.

A first dielectric layer can be disposed on the first patterned conductor on a side opposite the trilayer polymer film, and a second dielectric layer can be disposed on the second patterned conductor on a side opposite the trilayer polymer film. Optionally, each of the first dielectric layer and the second dielectric layer can have additional patterned conductors disposed thereon, on a side opposite the first patterned conductor and the second patterned conductor, respectively. In this way it is possible to provide a multilayer conductor comprising layer of conductor-dielectric-conductor-polymer core layer-conductor-dielectric-conductor-polymer core layer-conductor-dielectric-conductor. The number of layers following this pattern can be varied depending on the number of conductor-dielectric-conductor stacks laminated together using the trilayer polymer film of the present disclosure.

A multilayer conductor represents another aspect of the present disclosure. The multilayer conductor comprises a first patterned conductor having a patterned surface, a second patterned conductor having a patterned surface, and a polymer core layer comprising polytetrafluoroethylene, a perfluoroalkoxy polymer, or a fluorinated ethylene propylene polymer between the first patterned conductor and the second patterned conductor and in contact with the patterned surface of each of the first patterned conductor and the second patterned conductor. A second polymer component fills voids of the patterned features of each of the first patterned conductor and the second patterned conductor, such that no air gaps are present.

The second polymer component comprises a fluoropolymer, provided that the melting point of the second polymer component is at least 15° C. less than the melting point of the polymer core layer.

Each of the first patterned conductor, the second patterned conductor, and the polymer core layer can be as described above.

A first dielectric layer can be disposed on the first patterned conductor on a side opposite the polymer core layer and a second dielectric layer can be disposed on the second patterned conductor on a side opposite the polymer core layer. The thicknesses of the first and second dielectric layers and the polymer core layer are all within 10% of each other such that the spacing between adjacent conductor layers is consistent.

The multilayer conductor can comprise a plurality of conductor layers separated by the dielectric layers and the polymer core layers in an alternating fashion. In an aspect, the conductor layers can provide a curved electrical current path, for example defining a spiral electrical current path, which can be useful in producing coil-type structures.

A method for the manufacture of a multilayer conductor represents another aspect of the present disclosure. The method comprises bonding conductors using the trilayer polymer dielectric polymer film of the present disclosure. In an aspect, the method comprises providing a first layer having a first conductor bonded to a first side of a first dielectric layer, and a second conductor bonded to a second side of the first dielectric layer. The first side of the dielectric layer is opposed the second side of the dielectric layer. Each of the first and the second conductors has a plurality of patterned conductor features defining a plurality of voids on the first and second conductors, on a side opposite the dielectric layer.

The method further comprises providing a second layer having a third conductor bonded to a first side of a second dielectric layer, and a fourth conductor bonded to a second side of the second dielectric layer. The first side of the second dielectric layer is opposed the second side of the second dielectric layer. Each of the third and the fourth conductors has a plurality of patterned conductor features defining a plurality of voids on the third and fourth conductors, on a side opposite the second dielectric layer.

The method further comprises contacting the first layer with a first side of a first trilayer polymer film and contacting the second layer with a second side of the first film, wherein the trilayer polymer film is according to the present disclosure. The first side opposes the second side of the trilayer polymer film, and the patterned conductor features of the first conductor contact the first outer layer of the trilayer polymer film and the patterned conductor features of the third conductor contact the second outer layer of the trilayer polymer film.

The method further comprises laminating the first layer, the trilayer polymer film, and the second layer, wherein voids of the patterned features of each of the first conductor and the third conductor are filled with a polymer component derived from the first and second outer layers of the trilayer polymer film. The polymer core layer of the polymer trilayer film remains intact due to the differences in melting temperature, and thus provides the desired spacing between the conductor layers.

When a plurality of conductor layers are desired, a stack can be provided having the desired number of conductor-dielectric-conductor-trilayer polymer film layers arranged in order. Any number of layers can be provided that they are laid up in the order described herein. The first and second outer layers of each of the trilayer polymer films can have the same composition, and therefore the same melting temperature. Once the stack having the desired number of layers is provided, the entire stack can be laminated to provide the desired multilayer conductor in a single step.

In another aspect, when a plurality of conductor layers are desired, a multistep process can be used in which a first multilayer conductor stack and a second multilayer stack can be provided, each of the first and second multilayer stacks having the following layers: conductor-dielectric-conductor-polymer core layer-conductor-dielectric-conductor. Additional layers can be present provided that the stacks were prepared using the single step procedure described above. The first and second multilayer stacks can be arranged on opposite sides of a second trilayer polymer film, wherein the polymer core layer of the second film has a melting point that is at least 15° C. less than the melting point of the first and second outer layers of the first film, and the first and second outer layers of the second film have a melting temperature that is at least 15° C. lower than the core layer of the second film. If the melting point of the core layer and the first and second outer layers of the second film are not sufficiently different from the first and second outer layers of the trilayer polymer film that was used to prepare the first and second multilayer stacks, subsequent lamination can negatively affect the existing stacks. The contacting and laminating steps can be repeated until the desired number of alternating layers are obtained, provided that the core layer of the trilayer polymer film to be used in any subsequent lamination step is selected such that the melting temperature is at least 15° C. less than that of the first and second outer layers of any previously used trilayer polymer films, and the first and second outer layers of the trilayer polymer film to be used in any subsequent lamination step are selected such that the melting points are at least 15° C. less that the melting point of the core layer in the film.

For example, the method can further comprise providing a third layer having a fifth conductor bonded to a first side of a third dielectric layer, and a sixth conductor bonded to a second side of the third dielectric layer. The first side of the third dielectric layer is opposed to the second side of the third dielectric layer. Each of the fifth and the sixth conductors have a plurality of patterned conductor features defining a plurality of voids on the fifth and sixth conductors, on a side opposite the third dielectric layer. The method can further comprise contacting the first layer (i.e., which has already been bonded to the second layer via the trilayer polymer film) with a first side of a second trilayer polymer film and contacting the third layer with a second side of the second film. The second film is according to the present disclosure. The first side opposes the second side of the trilayer polymer film. The patterned conductor features of the second conductor contact the first outer layer of the second film and the patterned conductor features of the fifth conductor contact the second outer layer of the second film. The method further comprises laminating the first layer, the trilayer polymer film, and the third layer, wherein voids of the patterned features of each of the second conductor and the fifth conductor are filled with a polymer component derived from the first and second outer layers of the second film.

The multilayer conductor of the present disclosure can be useful in a magnetic self-resonant structure (MSRS). A magnetic self-resonant structure comprises a plurality of patterned conductor layers bonded by the trilayer polymer film according to the present disclosure. The outer layers of the trilayer polymer film will fill the gaps between the conductor features of the patterned conductor layer upon bonding of the multilayer conductor, and can further serve to seal the edges of the structure. Air provides very low dielectric breakdown strength. It is therefore preferable to displace the air with a polymer material with higher dielectric breakdown strength. This will prevent electrical discharge and reinforce the structure, so that mechanical oscillations or vibrations during use (such as attached to the bottom of a vehicle) do not damage the structure. The use of the trilayer polymer film of the present disclosure therefore can provide the advantage of reducing the number of steps in manufacturing the multilayer structures, as no additional steps to fill the gaps are required.

Accordingly self-resonant structure prepared by utilizing the trilayer polymer film disclosed herein represent another aspect of the present disclosure. The MSRS can be useful in wireless power transfer applications.

This disclosure is further illustrated by the following examples, which are non-limiting.

EXAMPLES

Materials used for the following Examples are described in Table 1.

TABLE 1

| Component | Chemical Description | Supplier |
|---|---|---|
| PTFE | Polytetrafluoroethylene film, obtained as CHEMFILM T-100 PREMIUM Skived PTFE film | Saint- Gobain Composite Solutions |
| PFA | Perfluoroalkoxy polymer film, obtained as CHEMFILM PFA PG | Saint- Gobain Composite Solutions |
| FEP | Fluorinated ethylene propylene, obtained as TEFLON FEP A | American Durafilm Company, Inc. |

Trilayer polymer films were prepared by manually stacking one layer at time during preparation of the multilayer bonding stack. It can also be prepared in advance by manually laying up the 3 layers of adhesive and using a 1 lb (0.454 kg) roller to apply pressure to the stack. This pressure will tack bond the 3 layers of adhesive together, allowing them to be moved as a single layer.

The trilayer polymer films were tested for bonding with a patterned copper conductor according to the following general procedure. The trilayer polymer was film sandwiched between two copper conductors, with the patterned features of each conductor facing the polymer film. The copper-polymer film-copper was then laminated to bond the copper conductors together.

In a first example, a trilayer polymer film having a core of PTFE (3 mil (0.076 millimeters (mm)) thickness) and outer layers each of PFA (2 mil (0.051 mm) thickness) was used to bond the patterned copper conductors, where each patterned conductor was 70 micrometers thick. The copper-polymer film-copper was laminated at a pressure of 250 PSI (1,724 kilopascals (kPa)), a maximum temperature of 620° F. (327° C.), and a dwell time of 40 minutes at the maximum temperature.

In a second example, a trilayer polymer film having a core of PTFE or PFA (3 mil (0.076 mm) thickness) and outer layers of FEP (2 mil (0.051 mm) thickness was used to bond the patterned copper conductors, where each patterned conductor was 70 micrometers thick. The copper-polymer film-copper was laminated at a pressure of 150 PSI (1,034 kPa), a maximum temperature of 550° F. (288° C.), and a dwell time of 40 minutes at the maximum temperature.

The flow and fill of the outer layers of the polymer film into the features of the patterned conductors was tested for voids. In one test, the bonded conductor layers were post-baked for 1 hour (h) at 200° F. (93° C.). The absence of delamination suggests that the outer layer of the polymer film fully flowed into and filled the gaps of the conductor. The presence of voids would cause delamination. The presence of voids can also be determined through acoustic scanning. A visual analysis of a cross-section of the bonded material can reveal voids. Each of the foregoing analysis techniques will show that the polymer film according to the present disclosure can flow into and fill the gaps of the conductor, thereby providing an effective bonding mechanism.

Figure 4:
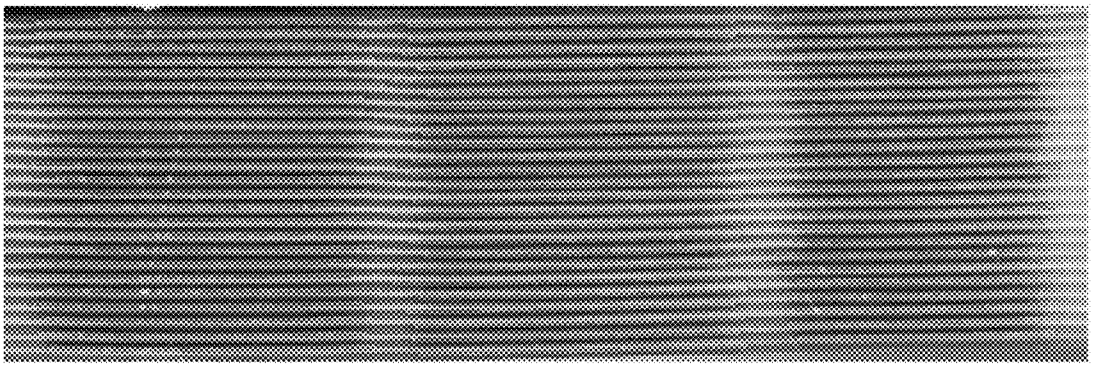
FIG. 4 is a cross-sectional image of multiple patterned conductors bonded together with a trilayer polymer film.
Figure 5:
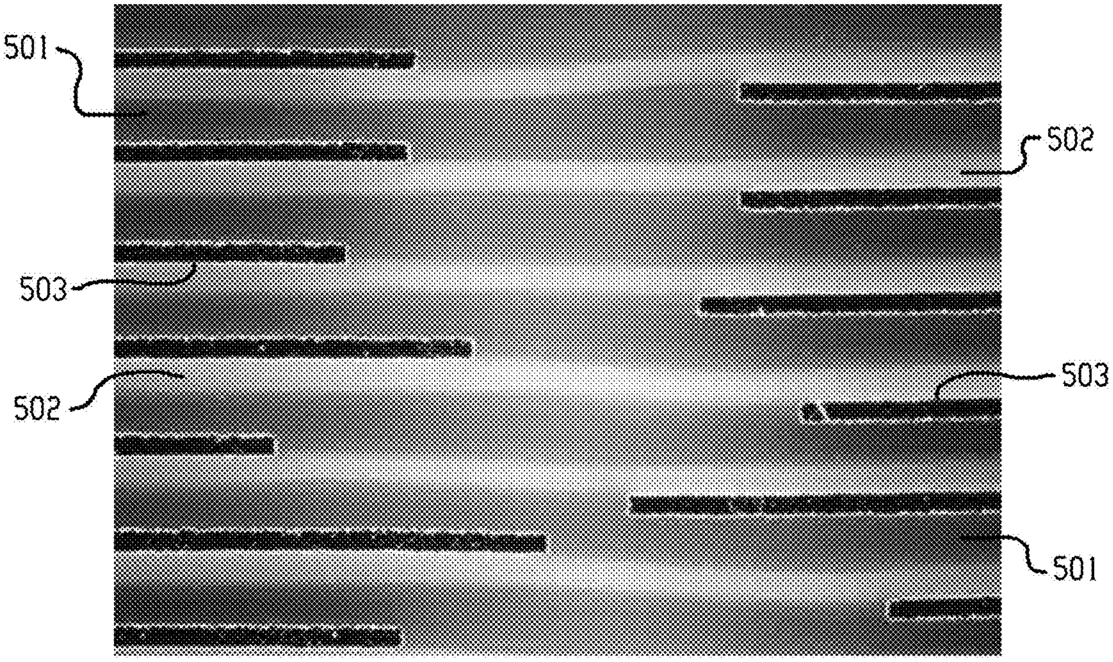
FIG. 5 is a higher magnification image of a cross section of a multilayer patterned conductor.

FIG. 4 shows a cross-sectional image of multiple patterned conductors bonded together by the trilayer adhesive. FIG. 5 shows a higher magnification image of a cross section of a multilayer patterned conductor. The white layers (502) are dielectric layers from the original two-layer patterned conductor. The dark gray layer (501) is the core layer that remains after lamination with the trilayer polymer film. The outer layers of the trilayer polymer film fill the openings or voids of the structured conductors. The spacing between the conductor layers (503) is maintained by the dielectric layers and the core layers.

This disclosure further encompasses the following aspects.

Aspect 1: A trilayer polymer film comprising: a core layer comprising polytetrafluoroethylene, a perfluoroalkoxy polymer, or a fluorinated ethylene propylene polymer; a first outer layer on a first surface of the core layer; and a second outer layer on a second surface of the core layer, opposite the first outer layer; wherein the first outer layer and the second outer layer each independently comprises a fluoropolymer having a melting temperature that is at least 15° C. less than a melting temperature of the core layer.

Aspect 2: The film of aspect 1, wherein the first outer layer and the second outer layer each comprises the same fluoropolymer.

Aspect 3: The film of aspect 1, wherein the first outer layer and the second outer layer each comprises a different fluoropolymer.

Aspect 4: The film of any of aspects 1 to 3, wherein the first outer layer and the second outer layer each comprises a fluoropolymer comprising a perfluoroalkoxy polymer or a fluorinated ethylene propylene polymer.

Aspect 5: The film of any of aspects 1 to 4, wherein the core layer further comprises a reinforcing agent.

Aspect 6: The film of aspect 5, wherein the reinforcing agent comprises woven or non-woven glass fibers.

Aspect 7: The film of any of aspects 1 to 6, wherein the core layer has a thickness of 1 to 20 micrometers.

Aspect 8: The film of any of aspects 1 to 7, wherein each of the first outer layer and the second outer layer has a thickness of 0.5 to 10 micrometers.

Aspect 9: The film of aspect 1, wherein: the core layer comprises polytetrafluorocthylene; and the first outer layer and the second outer layer each comprises a perfluoroalkoxy polymer.

Aspect 10: The film of aspect 1, wherein: the core layer comprises polytetrafluoroethylene; and the first outer layer and the second outer layer each comprises a fluorinated ethylene propylene polymer.

Aspect 11: The film of aspect 1, wherein: the core layer comprises a perfluoroalkoxy polymer; and the first outer layer and the second outer layer each comprises a fluorinated ethylene propylene polymer.

Aspect 12: A method of bonding patterned substrates, the method comprising: contacting a first patterned substrate with the film according to any of aspects 1 to 11, wherein a patterned surface of the first patterned substrate contacts the first outer layer of the film; contacting a second patterned substrate with the film on a side opposite the first patterned substrate, wherein a patterned surface of the second patterned substrate contacts the second outer layer of the film; and laminating the first patterned substrate, the film, and the second patterned substrate to provide a bonded stack comprising: the first patterned substrate; the second patterned substrate; a polymer core layer comprising polytetrafluoroethylene, a perfluoroalkoxy polymer, or a fluorinated ethylene propylene polymer between the first patterned substrate and the second patterned substrate and in contact with the patterned surface of each of the first patterned substrate and the second patterned substrate; wherein voids of the patterned features of each of the first patterned substrate and the second patterned substrate are filled with a second polymer component derived from the first and second outer layers of the film.

Aspect 13: The method of aspect 12, wherein the first patterned substrate and the second patterned substrate are patterned conductors.

Aspect 14: The method of aspect 13, wherein the first patterned conductor and the second patterned conductor each independently comprises copper or aluminum.

Aspect 15: The method of any of aspects 12 to 14, wherein a layer of the second polymer component is present at an interface between the polymer core layer and the first patterned substrate, the second patterned substrate, or both.

Aspect 16: The method of any of aspects 12 to 15, wherein the first patterned substrate and the second patterned substrate each independently has a thickness of 18 to 105 micrometers.

Aspect 17: The method of any of aspects 12 to 16, wherein the bonded stack does not have air gaps between the substrate and the polymer core layer.

Aspect 18: The method of any of aspects 12 to 17, wherein the first patterned substrate is a first patterned conductor; the second patterned substrate is a second patterned conductor; a first dielectric layer is disposed on the first patterned conductor on a side opposite the film; and a second dielectric layer is disposed on the second patterned conductor on a side opposite the film.

Aspect 19: The method of aspect 18, wherein each of the first dielectric layer and the second dielectric layer have a patterned conductor disposed thereon, on a side opposite the first patterned conductor and the second patterned conductor, respectively.

Aspect 20: A multilayer conductor, comprising: a first patterned conductor having a patterned surface; a second patterned conductor having a patterned surface; a polymer core layer comprising polytetrafluoroethylene, a perfluoroalkoxy polymer, or a fluorinated ethylene propylene polymer between the first patterned conductor and the second patterned conductor and in contact with the patterned surface of each of the first patterned conductor and the second patterned conductor; wherein a second polymer component fills voids of the patterned features of each of the first patterned conductor and the second patterned conductor; wherein the second polymer component is in contact with the first patterned conductor and a first side of the polymer core layer and between the second patterned conductor and a second side of the polymer core layer; and wherein the second polymer component comprises a fluoropolymer having a melting temperature that is at least 15° C. less than a melting temperature of the polymer core layer.

Aspect 21: The multilayer conductor of aspect 20, wherein the first patterned conductor and the second patterned conductor each independently comprises copper or aluminum.

Aspect 22: The multilayer conductor of any of aspects 20 to 21, wherein a layer of the second polymer component is present at an interface between the polymer core layer and the first patterned substrate, the second patterned substrate, or both.

Aspect 23: The multilayer conductor of any of aspects 20 to 22, wherein the second polymer component comprises a fluoropolymer comprising a perfluoroalkoxy polymer or a fluorinated ethylene propylene polymer.

Aspect 24: The multilayer conductor of any of aspects 20 to 23, wherein the polymer core layer further comprises a reinforcing agent.

Aspect 25: The multilayer conductor of any of aspects 20 to 24, wherein the polymer core layer comprises polytetrafluoroethylene; and the second polymer component comprises a perfluoroalkoxy polymer.

Aspect 26: The multilayer conductor of any of aspects 20 to 24, wherein: the polymer core layer comprises polytetrafluoroethylene; and the second polymer component comprises a fluorinated ethylene propylene polymer.

Aspect 27: The multilayer conductor of any of aspects 20 to 24, wherein: the polymer core layer comprises a perfluoroalkoxy polymer; and the second polymer component comprises a fluorinated ethylene propylene polymer.

Aspect 28: The multilayer conductor of any of aspects 20 to 27, further comprising a first dielectric layer disposed on the first patterned conductor on a side opposite the polymer core layer; and a second dielectric layer disposed on the second patterned conductor on a side opposite the polymer core layer.

Aspect 29: The multilayer conductor of aspect 28, wherein a thickness of the polymer core layer is within 10% of the thickness of each of the first and second dielectric layers.

Aspect 30: The multilayer conductor of any of aspects 20 to 29, wherein no air gaps between the first patterned conductor and the polymer core layer or the second patterned conductor and the polymer core layer are present.

Aspect 31: A method of forming a multilayer conductor, the method comprising: providing a first layer having a first conductor bonded to a first side of a first dielectric layer, and a second conductor bonded to a second side of the first dielectric layer, wherein the first side of the dielectric layer is opposed the second side of the dielectric layer, and wherein each of the first and the second conductors has a plurality of patterned conductor features defining a plurality of voids on the first and second conductors, on a side opposite the dielectric layer; providing a second layer having a third conductor bonded to a first side of a second dielectric layer, and a fourth conductor bonded to a second side of the second dielectric layer, wherein the first side of the second dielectric layer is opposed the second side of the second dielectric layer, and wherein each of the third and the fourth conductors has a plurality of patterned conductor features defining a plurality of voids on the third and fourth conductors, on a side opposite the second dielectric layer; contacting the first layer with a first side of a first trilayer polymer film and contacting the second layer with a second side of the first film, wherein the first film is the film according to any of aspects 1 to 11, wherein the first side opposes the second side of the first film, and wherein the patterned conductor features of the first conductor contact the first outer layer of the first film and the patterned conductor features of the third conductor contact the second outer layer of the first film; and laminating the first layer, the first film, and the second layer, wherein voids of the patterned features of each of the first conductor and the third conductor are filled with a polymer component derived from the first and second outer layers of the first film.

Aspect 32: The method of aspect 31, further comprising: providing a third layer having a fifth conductor bonded to a first side of a third dielectric layer, and a sixth conductor bonded to a second side of the third dielectric layer, wherein the first side of the third dielectric layer is opposed to the second side of the third dielectric layer, and wherein each of the fifth and the sixth conductors have a plurality of patterned conductor features defining a plurality of voids on the fifth and sixth conductors, on a side opposite the third dielectric layer; contacting the first layer with a first side of a second trilayer polymer film and contacting the third layer with a second side of the second film, wherein the second film is the film according to any of aspects 1 to 11, provided that the first and second outer layers of the second film each have a melting temperature that is at least 15° C. less than the melting points of the first and second outer layers of the first trilayer polymer film, wherein the first side opposes the second side of the second film, and wherein the patterned conductor features of the second conductor contact the first outer layer of the second film and the patterned conductor features of the fifth conductor contact the second outer layer of the second film; and laminating the first layer, the second film, and the third layer, wherein voids of the patterned features of each of the second conductor and the fifth conductor are filled with a polymer component derived from the first and second outer layers of the second film.

Aspect 33: The method of aspect 31 or 32, wherein the contacting and the laminating are repeated until a desired number of layers is reached, provided that each successive laminating step using a trilayer polymer film having first and second outer layers that each have a melting temperature that is at least 15° C. less than the melting point of the first and second outer layers used in prior laminating steps.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

It will be understood that when an element is referred to as being "on" another element or "in contact" with another element, it can be directly on the other element or intervening elements may be present therebetween, unless explicitly stated otherwise. In contrast, when an element is referred to as being "directly on" or "directly in contact with" another element, there are no intervening elements present.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multilayer conductor, comprising:

a first patterned conductor having a patterned surface;

a second patterned conductor having a patterned surface;

a polymer core layer comprising polytetrafluoroethylene, a perfluoroalkoxy polymer, or a fluorinated ethylene propylene polymer, and a reinforcing agent, wherein the polymer core layer is between the first patterned conductor and the second patterned conductor and in contact with the patterned surface of each of the first patterned conductor and the second patterned conductor;

a first dielectric layer disposed on the first patterned conductor on a side opposite the polymer core layer; and a second dielectric layer disposed on the second patterned conductor on a side opposite the polymer core layer;

wherein a thickness of the polymer core layer is within 10% of the thickness of each of the first and second dielectric layers;

wherein a second polymer component fills voids of the patterned features of each of the first patterned conductor and the second patterned conductor;

wherein the second polymer component is in contact with the first patterned conductor and a first side of the polymer core layer and between the second patterned conductor and a second side of the polymer core layer; and wherein the second polymer component comprises a fluoropolymer having a melting temperature that is at least 15° C. less than a melting temperature of the polymer core layer.

2. The multilayer conductor of claim 1, wherein the first patterned conductor and the second patterned conductor each independently comprises copper or aluminum.

3. The multilayer conductor of claim 1, wherein a layer of the second polymer component is present at an interface between the polymer core layer and the first patterned substrate, the second patterned substrate, or both.

4. The multilayer conductor of claim 1, wherein the second polymer component comprises a fluoropolymer comprising a perfluoroalkoxy polymer or a fluorinated ethylene propylene polymer.

5. The multilayer conductor of claim 1, wherein the polymer core layer comprises polytetrafluoroethylene; and the second polymer component comprises a perfluoroalkoxy polymer or fluorinated ethylene propylene polymer.

6. The multilayer conductor of claim 1, wherein:

the polymer core layer comprises a perfluoroalkoxy polymer; and the second polymer component comprises a fluorinated ethylene propylene polymer.

7. The multilayer conductor of claim 1, wherein no air gaps between the first patterned conductor and the polymer core layer or the second patterned conductor and the polymer core layer are present.

* * * * *